United States Patent
Jagota

(10) Patent No.: US 9,646,246 B2
(45) Date of Patent: May 9, 2017

(54) SYSTEM AND METHOD FOR USING A STATISTICAL CLASSIFIER TO SCORE CONTACT ENTITIES

(71) Applicant: salesforce.com, inc., San Francisco, CA (US)

(72) Inventor: Arun Kumar Jagota, Sunnyvale, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 43 days.

(21) Appl. No.: 13/773,141

(22) Filed: Feb. 21, 2013

(65) Prior Publication Data

US 2013/0166489 A1     Jun. 27, 2013

Related U.S. Application Data

(63) Continuation-in-part of application No. 13/034,463, filed on Feb. 24, 2011.

(60) Provisional application No. 61/667,847, filed on Jul. 3, 2012.

(51) Int. Cl.
    G06F 17/30    (2006.01)
    G06N 5/02     (2006.01)
    G06Q 30/02    (2012.01)

(52) U.S. Cl.
    CPC ......... G06N 5/02 (2013.01); G06F 17/30985 (2013.01); G06Q 30/02 (2013.01)

(58) Field of Classification Search
    CPC ........... G06F 17/2715; G06F 17/30569; G06F 17/271; G06F 17/275; G06F 17/278; G06J 9/00469

USPC .................................................. 707/755, 756
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Kang et al. "Schema Matching Using Interattribute Dependences." IEEE Transactions on Knowledge and Data Engineering, vol. 20, No. 10, Oct. 2008.

(Continued)

*Primary Examiner* — William Spieler
(74) *Attorney, Agent, or Firm* — Dergosits & Noah LLP; Todd A. Noah

(57) ABSTRACT

A system and method for associating a character string with one or more defined entities of a contact record. An input character string is received. The string is first evaluated to see if the structure of the string is recognized. If not, then the string is compared to entries in a look up table. If the string format is not recognized, and the string is not found in the look up table, then a posterior probability is calculated for a set of defined entities over a limited set of string processing features. The result of probabilistic scoring determines which of the defined entities to associate with the character string.

23 Claims, 8 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,718,325 B1 | 4/2004 | Chandra |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,664,776 B1 | 2/2010 | Cameron |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,140,533 B1 | 3/2012 | Elmeleegy et al. |
| 8,275,836 B2 | 9/2012 | Beaven et al. |
| 2001/0013035 A1 | 8/2001 | Cohen |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0233224 A1* | 12/2003 | Marchisio et al. ............... 704/4 |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0102303 A1 | 5/2005 | Russell et al. |
| 2005/0198157 A1 | 9/2005 | Young et al. |
| 2005/0278139 A1 | 12/2005 | Glaenzer et al. |
| 2006/0245641 A1* | 11/2006 | Viola et al. ............... 382/155 |
| 2007/0219966 A1 | 9/2007 | Baylis et al. |
| 2009/0005116 A1 | 1/2009 | Sharma et al. |
| 2009/0063415 A1 | 3/2009 | Chatfield et al. |
| 2010/0115491 A1 | 5/2010 | Malron et al. |
| 2010/0241416 A1* | 9/2010 | Jiang ............... G06F 17/28 704/7 |
| 2010/0318511 A1 | 12/2010 | Phan et al. |
| 2011/0007887 A1* | 1/2011 | Green ............... H04M 3/56 379/203.01 |
| 2012/0284259 A1 | 11/2012 | Jehuda |

OTHER PUBLICATIONS

Warren et al. "Multi-column Substring Matching for Database Schema Translation." VLDB '06, Sep. 12-15, 2006, Seoul, Korea.

* cited by examiner posteriors(s) # Returns a heuristic approximation to $P(e|F(s))$

A
  if $s$ is *structurally* recognized as an instance of entity $e$
      return $\{e \rightarrow 1\}$

B
  if $s$ is recognized by dictionary lookup as an instance of entity $e$
      return $\{e \rightarrow 1\}$

C
  if $n_e(fs, fs(s)) > 0$ for some entity $e$
      return $P(\cdot | \{fs \rightarrow fs(s)\})$

D
  if $n_e(db, db(s)) > 0$ for some entity $e$
      return $P(\cdot | \{db \rightarrow db(s)\})$

E
  $F' = \{lw, address\_line\_feature, w\}$
  return $P(\cdot | F'(s))$ end

*FIG. 6*

SYSTEM AND METHOD FOR USING A STATISTICAL CLASSIFIER TO SCORE CONTACT ENTITIES

CLAIM OF PRIORITY

This application claims priority from U.S. Provisional Patent Application No. 61/667,847 entitled Systems and Methods for a Statistical Classifier for Contact Entities with Advanced Features, by Arun Kumar Jagota, filed Jul. 3, 2012, which is incorporated herein by reference. This application is also a continuation-in-part of U.S. patent application Ser. No. 13/034,463 entitled Probabilistic Tree-Structured Learning System for Extracting Contact Data From Quotes, by Arun Kumar Jagota, filed Feb. 24, 2011, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to probabilistic methods for evaluating character strings, and more particularly, to methods for making a heuristic approximation of posterior probabilities for identify entities associated with character strings.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. A user of such a conventional database system typically retrieves data from and stores data on the database system using the user's own computing systems or devices. For example, a user system might remotely access one of a plurality of server systems that might in turn access the database system. Data retrieval from the system might include the issuance of a query from the user system to the database system. The database system might process the request for information received in the query and send to the user system information relevant to the request. The retrieval of accurate information and subsequent delivery of this information to the user system in a timely and efficient manner has been and continues to be a goal of administrators of database systems.

However, in a multi-tenant database system ("MTS"), various elements of hardware and software of the database system may be shared by one or more customers. The notion of "cloud computing" has recently developed whereby service providers offer access to hardware/software systems through a network, such as the Internet. For example, a specified application server may simultaneously process requests for many customers, and a specified database table may store rows of data for many customers.

In the MTS environment, customers demand up-to-date, comprehensive data. For example, sales and marketing organizations need accurate and up-to-date contact information in order to maintain good relations with existing customers as well as solicit leads for new customers.

Unfortunately, conventional database approaches rely on individuals to maintain their own contact information, and therefore, even within a single organization, individuals may have inconsistent and/or inaccurate contact information.

An advantage of the MTS system is that business enterprises may share data resources, and rely on the MTS provider to maintain accurate up-to-date data, such as personal and/or business contact information. Another advantage is that all personnel within a single enterprise have access to the exact same contact information, so that inaccuracies or inconsistencies within the organization no longer exist. However, new or updated information is typically received by the MTS as one or more character strings, and it can be difficult to accurately identifying the entity that the character string is associated with.

Accordingly, it is desirable to provide techniques for correlating character strings to database entities, thereby enabling updating of data stored in a database system, such as contact information, in order to provide the most up-to-date and accurate information available in seamless fashion to customers of the MTS.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 6 is a software code listing for the process of FIG. 5.

DETAILED DESCRIPTION

1. Simplified System Overview

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query refers to a set of steps used to access information in a database system.

Figure 1:
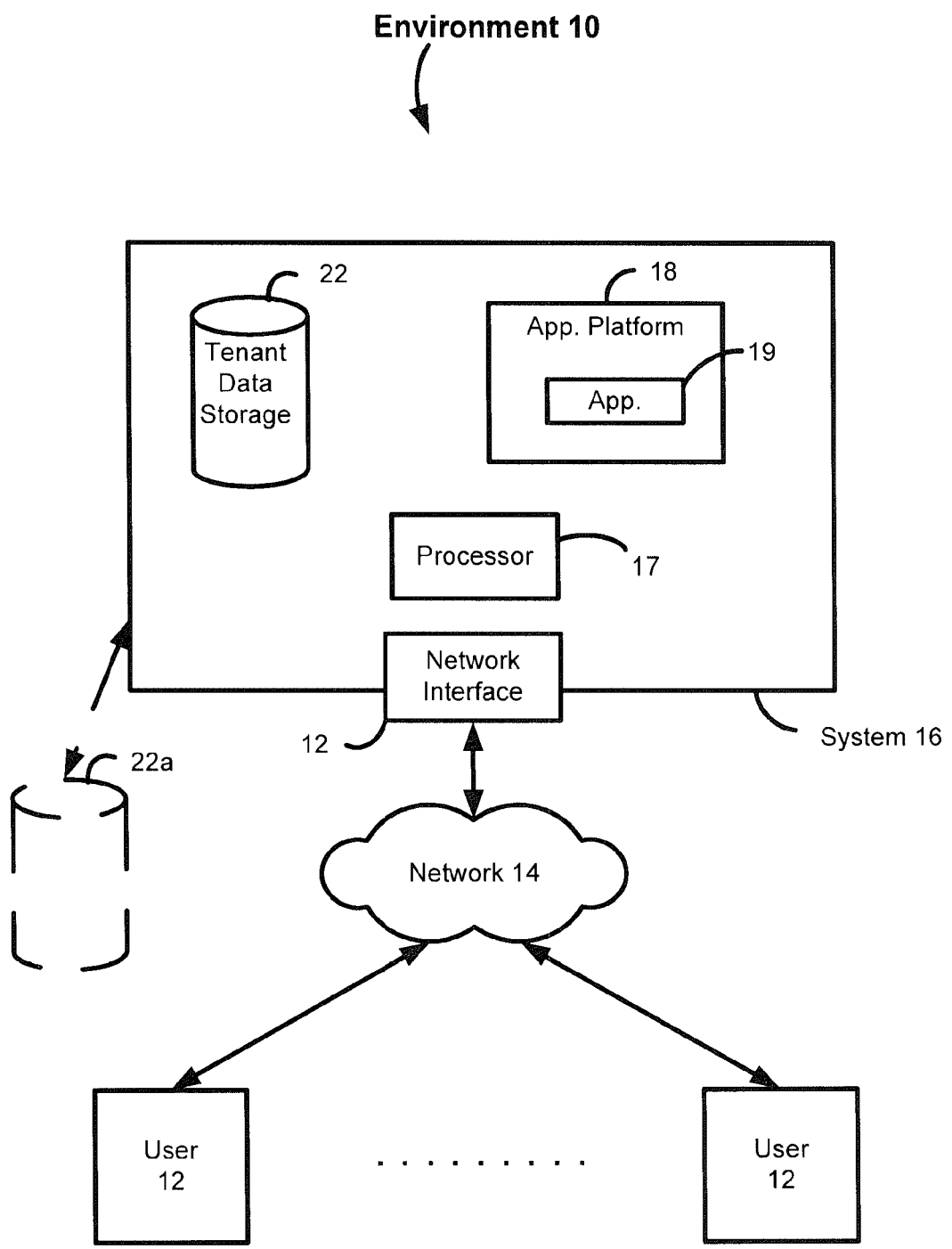
FIG. 1 is a simplified block diagram illustrating a multi-tenant database system ("MTS").
Figure 2A:
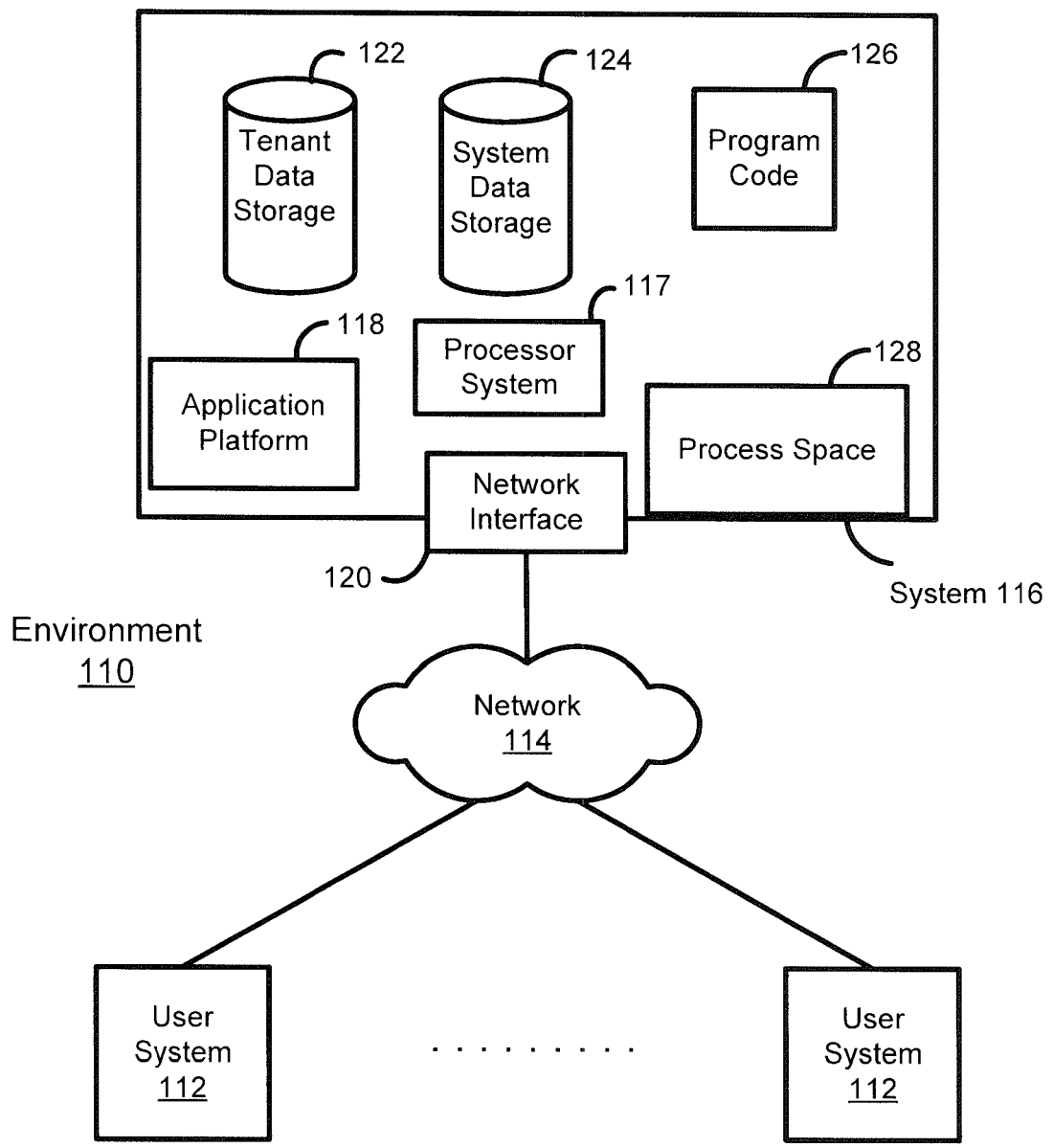
FIG. 2A illustrates a block diagram of an example of an environment wherein an on-demand database service might be used.
Figure 2B:
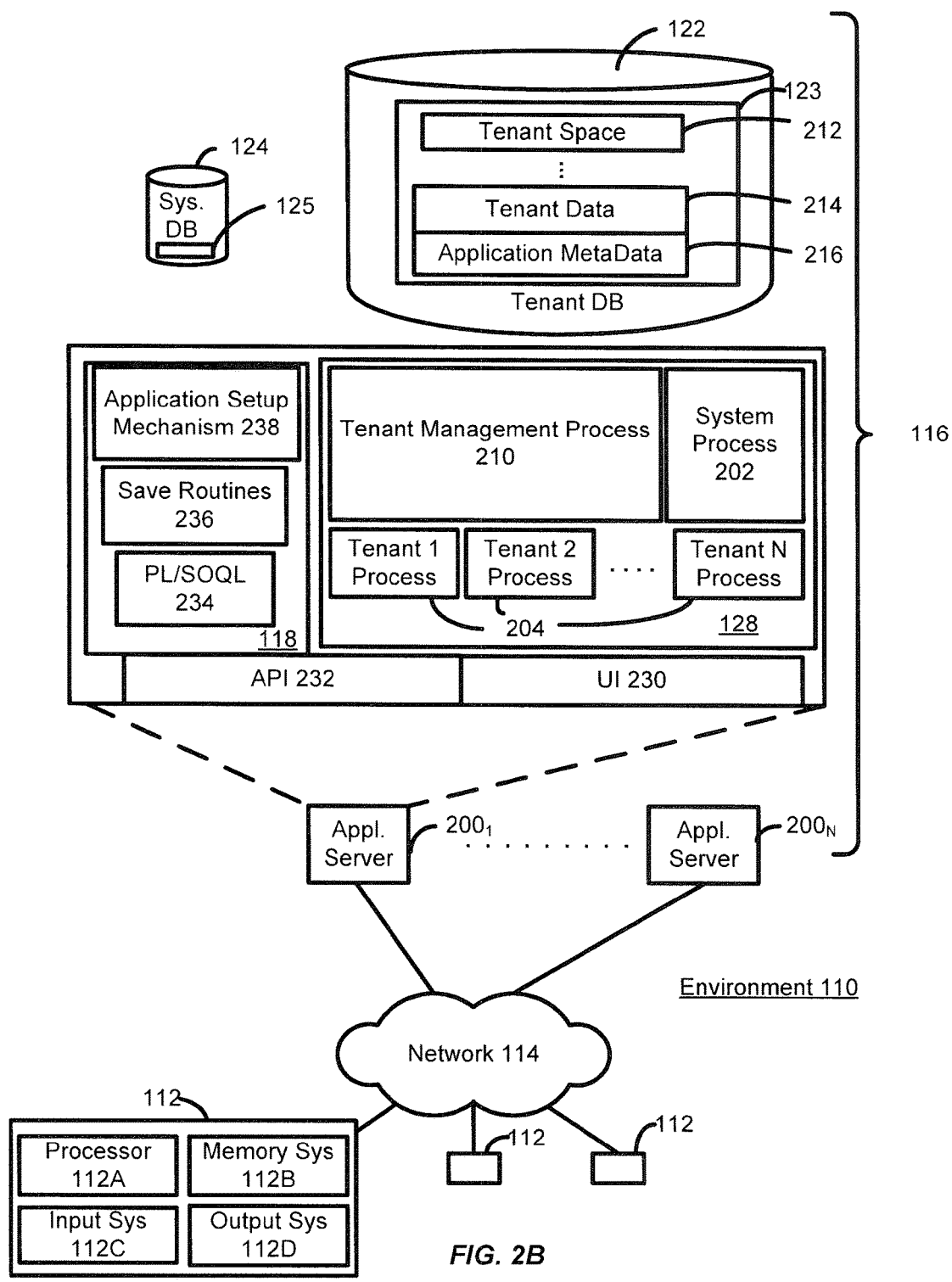
FIG. 2B illustrates a block diagram of an embodiment of elements of FIG. 2A and various possible interconnections between those elements.

FIG. 1 illustrates an embodiment of an on-demand, multi-tenant database service ("MTS") 16 operating in a computing environment 10. User devices or systems 12 access and communicate with the MTS 16 through network 14 in a known manner. More detailed examples for implementing the MTS 16 are shown in FIGS. 2A-2B, described below. For example, user devices 12 may be any computing device, such as a desktop, laptop, table, smartphone, etc. Network 14 may be any type of computing network, such as the Internet, local area network, wide area network, etc. The operation of the MTS 16 is controlled by a processor system 17 running an operating system.

The MTS 16 provides the users of user systems 12 with access to many features and applications available on or through MTS 16. In particular, the MTS 16 includes tenant data storage 22, which is configured through the MTS to maintain tenant data for multiple users/tenants, as further described below and in the patent references mentioned above. Tenant data storage 22 (shown in dashed lines) may be physically incorporated within MTS 16, or may alternatively be remote storage 22a (shown in dashed lines), likewise accessible and useful to the MTS to support user systems 12.

Figure 3:
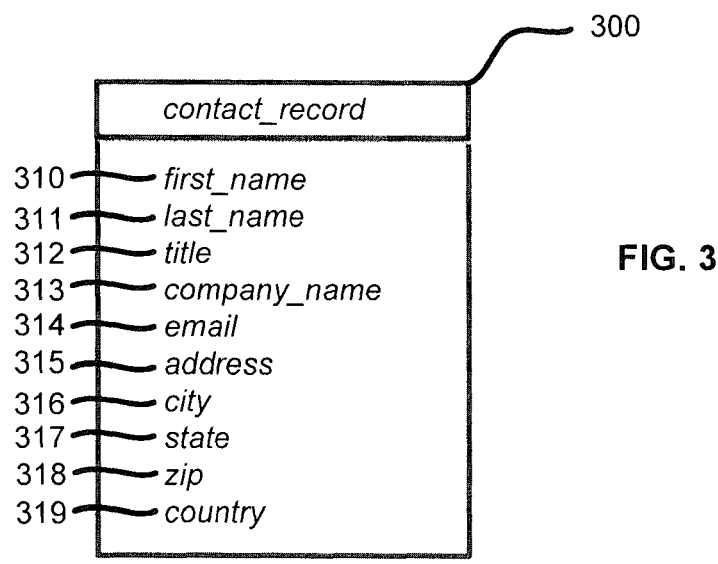
FIG. 3 is a block diagram illustrating a contact record.

There are many types of tenant data that may be maintained in tenant data storage 22, including, in particular, contact data, i.e., information about an individual, including name, company, address, telephone number, etc. FIG. 3 illustrates a typical database record 300 for a contact. In this embodiment, the contact record 300 has 10 defined fields or entities: first_name 310, last_name 311, (job) title 312, company_name 313, email 314, address 315, city 316, state 317, zip 318, and country 319. Other fields or other formats may be used.

An important objective for any user of MTS 16 is to maintain up-to-date and detailed information for all contacts. A unique feature of MTS 16 described herein is one or more applications 19, managed and operated by the MTS through its application platform 18, that facilitate this objective by providing one or more sets of program instructions providing features to help maintain and secure the accuracy and reliability of the contact data. For example, instructions may be provided for crawling the Internet or any other available network or document repository to find relevant information; for extracting a string of characters; and for making a probabilistic determination as to which entity the string belongs.

Figure 4:
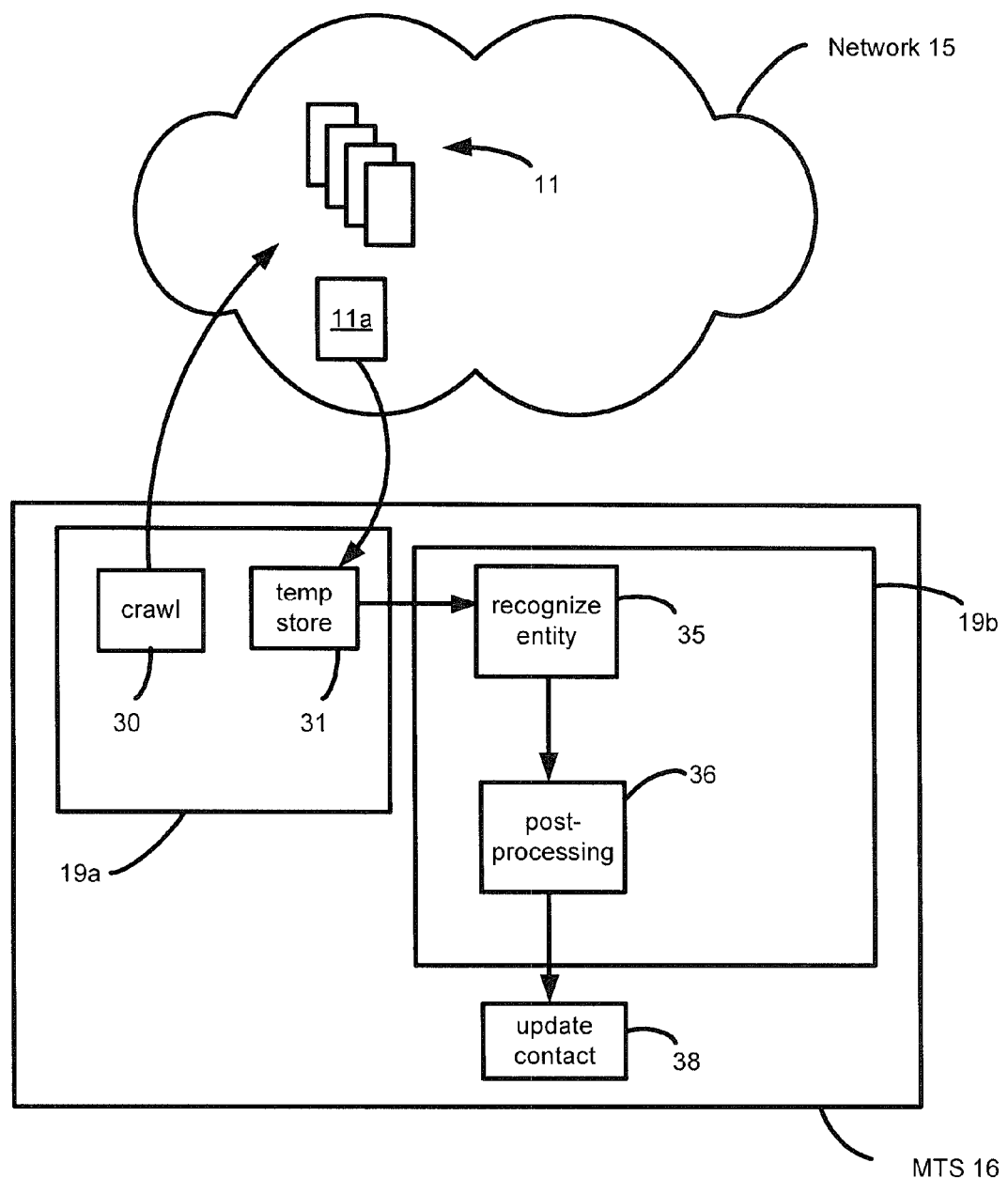
FIG. 4 is a block diagram illustrating the operational flow of handling a character string through the MTS.

The block diagram shown in FIG. 4 illustrates the operation of an application 19a, in which a crawl module 30 has program code suitable to perform a crawl of network 15 to search through documents 11 for data 11a meeting search criteria. Further, the crawl module 30 includes program code suitable to flag and grab a copy of the data 11a and place the grabbed material in temporary storage 31 for processing by the extractor application 19b. The creation of program code for the document crawl and grab as described above is routine for those skilled in these arts and need not be described in further detail herein. For example, a web crawler program may be designed to search for information about individuals in order to extract contact data for the purpose of updating the contact database. When found, some portion of the document containing the information is copied, e.g., one or more character strings, and sent for processing by extractor application 19b. Further, although two applications 19a and 19b are shown as part of the MTS 16, these applications may implemented in one or more parts or modules, and may also be located elsewhere but accessible to the MTS. Also, the construction of suitable program code and interaction between different code modules can vary greatly according to need and/or desire and thus the illustrated embodiments are not intended to limit how various software solutions may be implemented.

Once a character string is placed into temporary store 31, the extractor application 19b processes the character string to identify by some means the entity it represents, e.g, one of the defined fields 310-319 of record 300. Applying a probabilistic formulation to this problem is the primary subject of this disclosure. Once identified, information is used to update and/or enrich stored information associated with a contact stored as a data record in MTS 16.

The extractor application 19b includes an entity identification module 35 that is configured to try and identify specific "entities" within the character string. That is, the module 35 takes the character string from temporary store 31 and performs analysis of the character string that includes probabilistic scoring. Such scoring can be learned from training sets in order to improve the probability of recognizing primary entities, such as first_name, last_name, company, etc. Once the entity is identified, there may be a post-processing module 36 that finalizes and formats information obtained from the entity identification module 35. Finally, the information is sent to module 38 for updating contact records.

Accurately extracting "entities" from character strings and then using the extracted entities to update and/or enrich contact information can be difficult due to the great variety of ways the information may be presented. For example, sometimes the person's name appears first, sometimes later; sometimes there is a company name listed, sometimes not; sometimes the company name appears before the title of the person, sometimes after; sometimes a name may seem to have multiple possible entities; and so on. However, notwithstanding this variability, there are also cues in the character string itself, and in its relationship to other character strings, which help make a proper characterization of an entity.

2. Entity Recognition in Character Strings

A probabilistic scoring method incorporates a Bayes classifier to compute a posterior probability distribution over various defined entities of a contact record for any given input. The Bayes classifier algorithm is well known. See, for example, T. Mitchell, *Machine Learning* (McGraw-Hill 1997). As an example, consider the string "Cisco." The probability that the string is one of the defined entities of the contact record can be written as P(first_name|"Cisco"), P(last_name|"Cisco"), P(title|"Cisco"), etc. These probabilities quantify the likelihood that the character string "Cisco" is a first name vs. a last name vs. a job title, etc. Accordingly, the posterior probabilities can be written as P(e|s), where e denotes the entity and s denotes the input string. However, the method described herein uses advanced features of the Bayes method, described below, to help recognize the defined entities as accurately as possible. Thus, the posterior probabilities are not computed directly from string s, but instead from a certain set of features extracted from string s.

Let f denote a certain feature of the Bayes classifier, and therefore f(s) is its value in s. Then let $F(s)=\{f \rightarrow f(s)\}$ denote the set of (feature-name, feature-value) pairs in string s. Therefore, P(e|F(s)) is a succinct and precise way of saying that the posterior probably that the character string is entity e is computed from the features extracted from s. However, rather than using only the strict probabilistic formulation, an heuristic, iterative method is described which looks at the character string s and decides which features to use for that particular character string s, thereby providing a reasonable approximation of the posterior probability.

A. Features for String Recognition

There are many applications that have a need to recognize the entity of a given character string s. For example, the string "Los Angeles" should be recognized as a city, the string "94512" is probably a zip, and the string "John" is probably a first name. These type of determinations can be made by finding the entity which has the highest approximate posterior probability for the given string s. This entity is then guessed to be the correct entity, and its posterior probability is the confidence in that prediction. Further, if the confidence is not high enough, then the guess may be abandoned and no prediction made.

Other applications may use the posterior probabilities in a more elaborate scoring scheme. For instance, when checking spreadsheets for fraudulent or bad data, each value in a column is scored against the entity the column represents. For example, if the column has a header that indicates that the column stores "job titles," and one of the values in this column is "XYZ Inc," then this value should get a low score because it is clearly a company name, not a title. This score can simply be the approximate posterior probability of the column's entity given that value. The posterior probabilities of the column's entity are calculated one by one for all values in the column. The overall score can then be defined to be the average of these posterior probabilities. The score then quantifies how well the data in the column fits the column's entity.

The Bayes classifier can be used to define an advanced set of features which help discriminate among entities. The relatively harder cases are distinguishing person names from titles; distinguishing titles from company names; distinguishing person names, titles, and company names from address lines; and distinguishing phone numbers from zip codes.

The advanced features are described below. All of the features change the string to lower-case and remove any flanking white space from it.

The last word feature, denoted as lw(s), returns the last word in the input string.

The digit-blurring feature, denoted as db(s), replaces every numerical digit in the input string by the character 'd.'

The words feature, denoted as w(s), returns a set of one or more words in the string, i.e. substrings, separated by white space. The last word is excluded from this feature because it is already in the feature lw(s).

The full string feature, denoted as fs(s), returns a version of the original string s in lower case characters with flanking white space removed.

The address line feature is a fairly elaborate feature. This feature is used to accurately discriminate between strings that form address lines and strings that form other entities, such as title, company name, city, first name, etc. For example, let $s_1 s_2 \ldots s_k$ denote the token sequence of the string s obtained by splitting the string on white space. The feature is the string f(s) formed by concatenating $f_1, f_2, \ldots, f_k$, joined by a single blank, where each $f_i$ is a string, and $f_i$ equals "d" if $s_i$ is all digits; $f_i$ equals "w" if $s_i$ is all non-digits; $f_i$ equals "wd" if $s_i$ is a mix of digits and non-digits; $f_i$ equals $n(s_i)$ if $s_i$ is a normalizable word; else $f_i$ equals "ws".

The term $n(s_i)$ needs additional explanation. The desired normalizations may be represented as a map n: string→string, i.e. a map of (key, value) pairs. If $s_i$ (after changing to lower-case and stripping away flanking white spaces) is a key in this map, then $f_i$ is set to $n(s_i)$. The example below shows a few (key, value) pairs that are put into the map n.

avenue→road, road→road, boulevard→road, blvd→road

These key/value pairs are chosen since they help discriminate strings in address lines from strings in other entities. Normalizing different ways of saying the same thing, e.g. all of these terms can be treated as "road," leads to a more compact model, and compact models tend to generalize better. One way to think about this normalization is the following: take any address line having the word "avenue" (or "boulevard" etc.) in it, and replace the word "avenue" with the word "road." This action does not change the prediction that that string is an address line (and not a title, or a company name, etc.).

B. Last Word Feature

The last word feature is a strong predictor that the string s is a company name. A few examples are presented in Table I below.

TABLE I

| String | Feature value |
| --- | --- |
| "XYZ Corp" | "corp" |
| "Johnson Computers" | "computers" |
| "VP of Sales" | "sales" |

For example, the string "XYZ Corp" will get predicted as a company name because it ends with the word "corp" as detected by the last word feature. This will happen even if "XYZ Corp" is not in the training set. Thus, the last word feature helps the algorithm to generalize, i.e., to be able to detect companies as company names even when not in the training set.

The effect of this feature could be partly emulated by maintaining a dictionary of common company name suffixes, such as inc, corp, etc., and applying a rule "If the last word in the string is one of these suffixes, then predict that the string is a company name." However, the statistical classifier employing the last word feature works much better, provided that a large and representative training set of the various entities is available.

The statistical classifier is more effective works better than a dictionary look-up because the statistical classifier automatically extracts words from the training set that, when occurring as last words in strings, are strong predictors that the string is a company or organization name. Beyond the common company suffixes that would get picked up automatically, these include words such as systems, trust, board, computers, agency, etc. Reconstructing these "soft" company name suffixes manually would be a daunting task.

No less importantly, even if such a set could be assembled somehow, the rule makes a hard decision just based on this feature, and such a decision would be too risky in many cases. The statistical classifier, by contrast, uses the predictions and their strengths made by this feature in conjunction with those from other features and is thus more accurate. To illustrate, consider the string "XYZ Systems." The statistical classifier would conclude that this is highly likely to be a company name because it ends with "Systems" and "XYZ" does not predict some other entity. (Some other features could come into play as well, if warranted.) Consider a different string VP of Information Systems. Although Systems predicts company name strongly, it predicts title at least weakly under the (reasonable) assumption that titles ending with the word Systems are also in the training set of titles. Furthermore other features extracted from the string (e.g. VP) predict title much more strongly than company name.

So one would expect the aggregate of the evidence from the various features to favor title, as it should.

C. Digit-Blurring Feature

The digit-blurring feature is a strong predictor that the string is a phone or a zip, and which of the two. The numerical specific digits of the string are blurred out, but the position of the digits is retained, as well as the identity of the other characters. Some examples are presented in Table II below.

TABLE II

| String | Feature value |
|---|---|
| "346 4928" | "ddd dddd" |
| "+1 (592) 346 4928" | "+d (ddd) ddd dddd" |
| "95128" | "ddddd" |
| "95128-4209" | "ddddd-dddd" |
| "John Van" | "john van" |
| "SW1A 0AA" | "swda daa" |
| "+61 418 123456" | "+dd ddd dddddd" |

Blurring out the specific digits allows generalization, i.e., recognition of strings that are phones or zips, but that are not in the training set as such. Replacing each of the numerical digits with the letter and keeping the rest of the non-numerical characters intact retains just the information to distinguish phones from zips and other entities. For example, dddd-dddd is more likely to be a zip than a phone, and "+dd ddd dddddd" is more likely to be a phone than a zip.

This feature allows a system to 'learn' many different formats of phones and zips without having to explicitly model each one of them. All it requires is that the training set be rich enough. For example, to recognize phone numbers from different countries, the training set should have examples of phone numbers from different countries. Also, phone numbers from the same country with different formats could be included simply by including examples of each format in the training set. Thus, a training set could have U.S. phone numbers with the long-distance prefix "+1" missing, or with the "+" missing, that use parentheses, hyphens, or periods, etc. Similarly, the training set could have 5-digit U.S. zip codes and the more comprehensive format of (5+4)-digit U.S. zip codes.

D. Words Feature

This discussion applies to the combination of the words features and the last word feature (described above). Several examples are shown in Table III below.

TABLE III

| String | Values of features |
|---|---|
| "Vice President of Sales" | {"vice", "president", "of"} |
| "John Van" | {"john"} |
| "123 Market St" | {"123", "market"} |
| "346 4928" | {"346"} |
| "New York" | {"new"} |
| "john" | { } |

These two features work well to discriminate titles from other entities. This is because certain words, such as 'president,' 'vice,' 'officer,' 'chief,' and many others, almost always occur in titles, but not in other entities. These two features also help with generalization in multi-word first and last names. As an example, if "John Van" is labeled as a first name in the training set, these features predict that "John" and "Van" are also plausible first names.

E. Full String Feature

This discussion applies to the combination of the words features and the last word feature (described above). Several examples are shown in Table IV below.

TABLE IV

| String | Feature value |
|---|---|
| "Los Angeles" | "los angeles" |
| "California" | "california" |
| "123 Market St" | {"123", "market"} |
| "346 4928" | {"346"} |
| "New York" | {"new"} |
| "john" | { } |

The full string feature is useful for recognition of entities whose values tend to be from a controlled vocabulary, namely city and state. Consider the string "California." The method should predict that the entity is state with 100% confidence. Now consider the string "California Security Systems." The method should now predict that the entity is company name instead. The full string feature ensures that the former happens, while the words feature makes the latter happen.

F. Address Line Feature

The address line feature is a strong predictor that the string is an address line. Several examples are shown in Table IV below.

TABLE V

| String | Feature value |
|---|---|
| "1 Market St" | "d w road" |
| "One Broadway Blvd" | "d w road" |
| "Intel" | "w" |
| "L5 Inc" | "wd w" |
| "New York" | "w w" |
| "408 345-1234" | "d ws" |
| "Vice President of Sales" | "w w w w" |

This discussion applies to the combination of the words features and the last word feature (described above). Several examples are shown in Table IV below.

G. Training Set

The aim of training is to learn, from a training set, the correlations between the values of the various features and the defined entities. Table VI below is a small sample training set. (note—an actual training set to produce an accurate classifier would have a lot more examples, perhaps several million.).

TABLE VI

| String | Correct entity |
|---|---|
| "Vice President of Sales" | title |
| "XYZ Inc" | Company name |
| "123 Market St" | Address line |
| "+1 921 346 4928" | phone |
| "95316" | zip |
| "New York" | state |
| "New York" | city |
| "New York" | state |
| "Australia" | Country |
| "Los Angeles" | state |
| "New York City" | City |
| "John" | First name |
| "Smith" | Last name |
| "Cleveland" | city |
| "Cleveland" | Last name |

Note that the same example(s) can appear multiple times in the training set. This can be useful—the classifier uses frequency (among several other factors) to strengthen the learned correlations between the values of various features and the entities. Also note that the training set can contain the same string mapped to different entities. For example, the string "Cleveland" is a city but it can also be a last name. In a rich training set, one would expect ("Cleveland", city) to occur much more frequently than ("Cleveland", last name). This and the fact that there is much more diversity in last names than cities allows the classifier to automatically learn that "Cleveland" is a city or a last name, with the former being more likely in the absence of other information.

H. Training Process

Let (s, e) denote an example in the training set, where s is the string and e its correct entity. In this notation, e is called the label of s. First, the set of all features F(s) are extracted from s. Then, each of two counters is incremented by one (both counters are initialized to 0 at the beginning of the training). $n_e$ is then the number of examples in the training set labeled e, while $n_e(f,f(s))$ is the number of examples in the training set labeled e whose feature f has value f(s).

From these counts, we get $$P(f(s)|e) = \frac{n_e(f, f(s))}{n_e},$$

which is used for computing the posterior probabilities, as further described below. An example of a string and the various features extracted from it is shown in Table VII below.

TABLE VII

| String | "123 market St" |
| Last word feature | "st" |
| Word features | {"123", "market"} |
| Full string feature | "123 market St" |
| Address line feature | "d w road" |

3. Heuristic Approximation of Posterior Probabilities

Figure 5A:
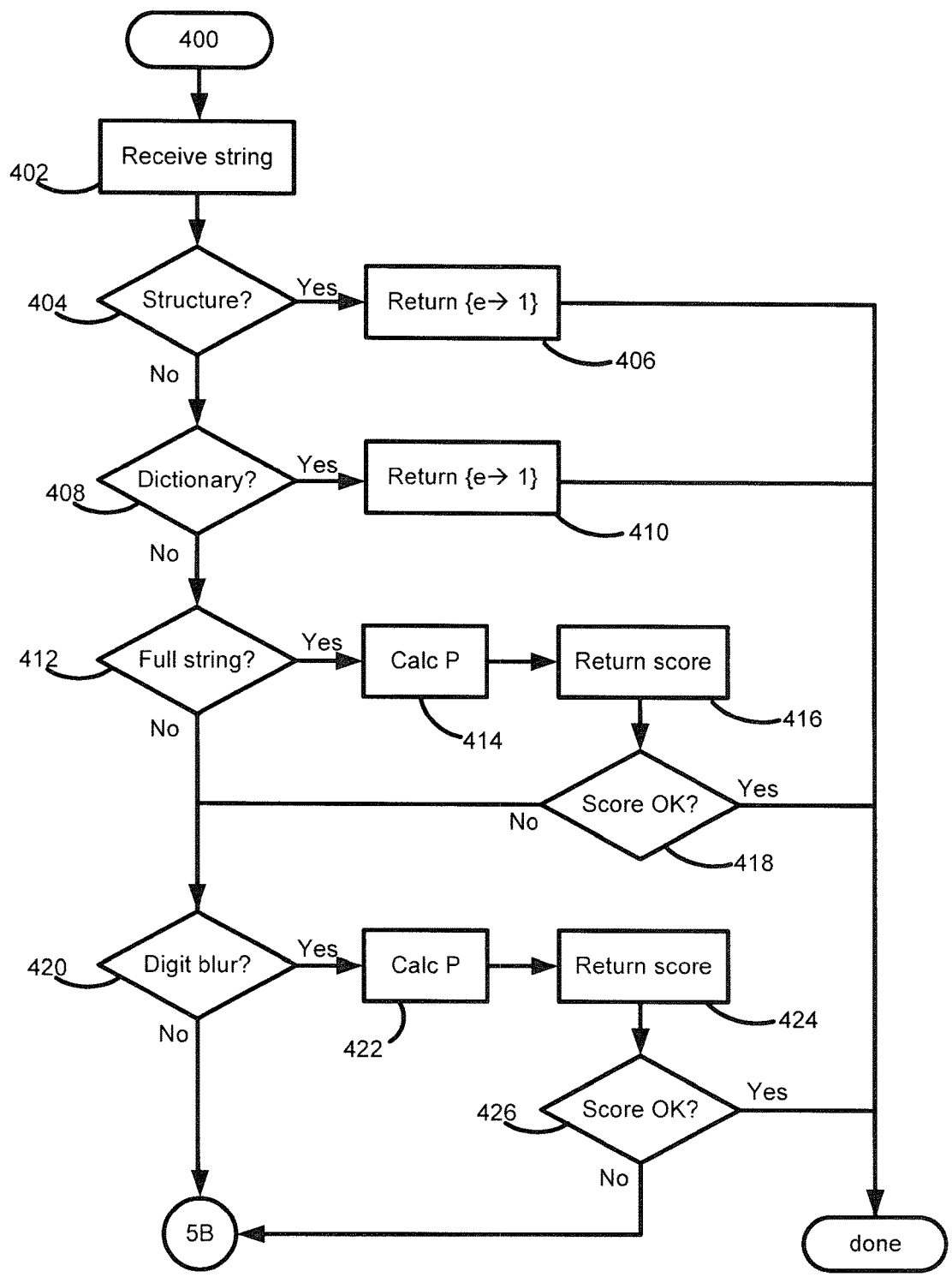
FIGS. 5A & 5B are flow charts illustrating a process for applying a statistical classifier to the problem of identifying an entity associated with a character string.
Figure 5B:
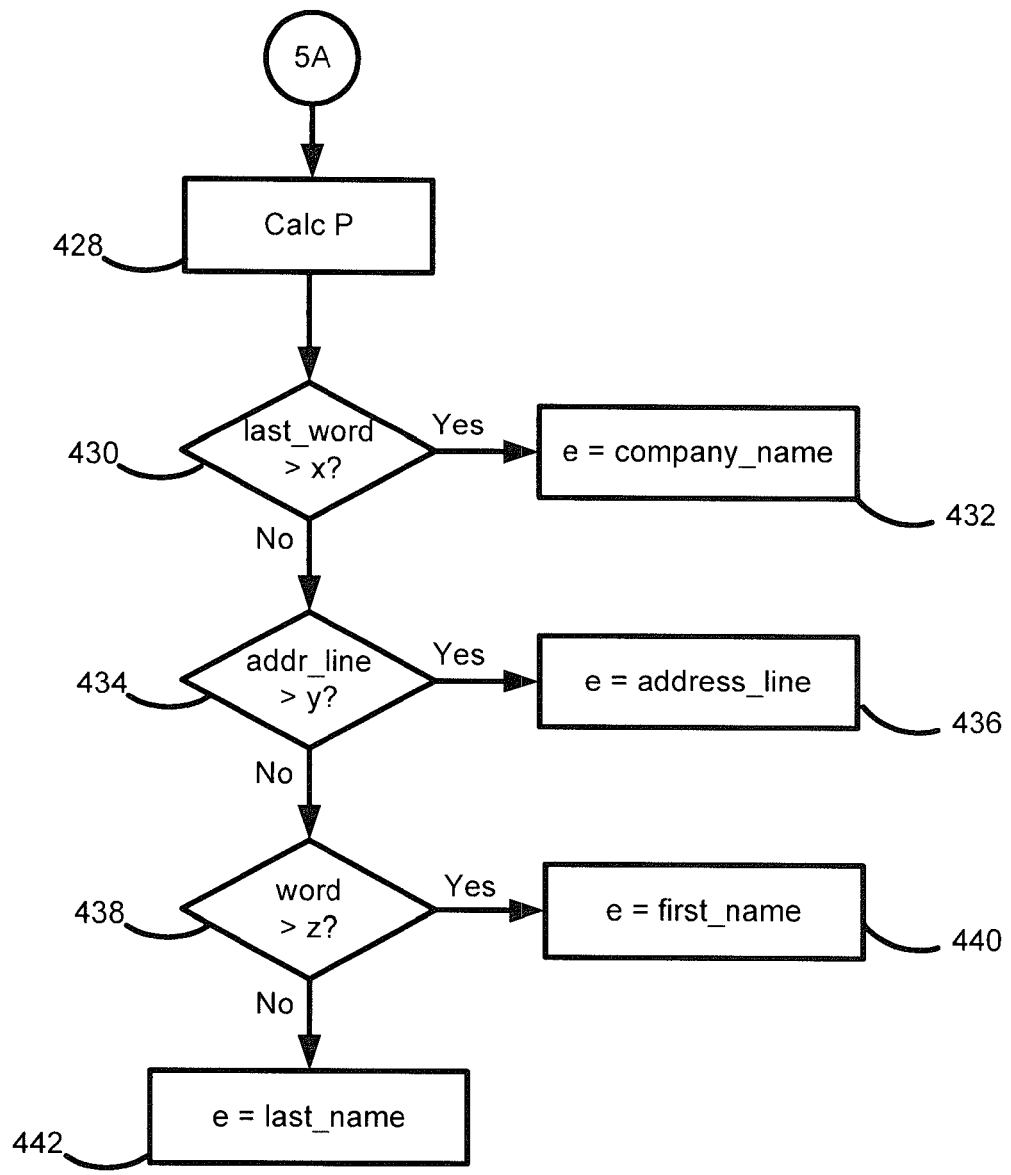

FIGS. 5A and 5B illustrate a process 400 that provides a heuristic approximation of the posterior probabilities that a character string s is one or more of the defined entities. The process 400 is preferably provided as an integrated web service, for example, as application 19 of MTS 16 in FIG. 4, but could be provided in other forms as well.

In step 402, an input character string is received. In step 404, the string is evaluated to see if it is recognized structurally as a particular instance of entity e. If so, then in step 406, a score of 1 is returned for entity e, i.e., the probability is 100% that the string is actually entity e. The structural recognition step is done first because it is only successful where there is a near certainty that the structure of the string is correctly identified as representing the entity e. There must be no ambiguity, i.e., the structure must be well-defined. For example, an email address typically has the format <name@domain>. Structural rules may be developed from the training set.

If the string is not structurally recognized in step 404, then the string is evaluated in step 408 for dictionary-based recognition. If so, then in step 410, a score of 1 is returned for entity e, i.e., again, the probability is 100% that the string is actually entity e. As with structural recognition, there must be a near certainty that the structure of the string is correctly identified as representing the entity e. Dictionary-based rules may also be developed from the training set.

If dictionary-based recognition does not occur in step 408, then the string is evaluated in step 412 for a "softer" version of dictionary-based recognition. More specifically, the full string feature is applied to the string, and if there is at least one example of that string in the training set, i.e., if $n_e$(fs, fs(s))>0, then in step 414, the posterior probabilities are calculated for each of the defined entities over the full string feature, i.e., P(·|{fs→fs(s)}), and the score is returned in step 416. If the score for any entity is high enough in step 418, then characterizing the string as that entity may be accepted. If the score is not high enough, then characterizing the string as that entity may be rejected, and the process continues.

Take s=cleveland as an example. $n_e$(fs,fs(cleveland)) is greater than 0 for e being {city, last_name, . . . }. Therefore, the posteriors of various entities are computed over this feature value. This should inform us that cleveland has a high probability of being a city, and a lower (but greater than zero) probability of being a person's last name.

If there is not at least one example of the string in the training set in step 412, or if the string characterization is rejected in step 418, then the digits blurring feature will be evaluated. More specifically, the digit blurring feature is applied to the string in step 420, and if there is at least one example of that string in the training set, i.e., $n_e$(db,db(s))>0, then in step 422, the posterior probabilities are calculated for each of the defined entities over the digit blurring feature, i.e., P(·|{db→db(s)}), and the score is returned in step 424. If the score for any entity is high enough in step 426, then characterizing the string as that entity may be accepted. If the score is not high enough, then characterizing the string as that entity may be rejected, and the process continues.

The digit blurring step accurately scores phone versus zip. For example, the string "ddddd-dddd" will be scored high for being a zip and much lower for being a phone; v the string "dddddddd" will be scored roughly the same for being a zip or a phone; and "+1 ddd ddd-dddd" will be scored very high for being a phone and zero or near-zero for being a zip.

If there is not at least one example of the string in the training set in step 420, or if the string characterization is rejected in step 426, then the string is probably an address line, a company name, or an unknown first name or last name of a person. Step 428 calculates posterior probability for each of the three remaining features (address_line, company_name, last_word) over all entities. The score is then used to discriminate between these entities.

Generally, for any subset F'(s) of F(s), P(·|F'(s)) denotes the distribution of posterior probabilities restricted to the features in F'(s). P(·|F'(s)) is computed in the usual way, by applying the Bayes rule under the assumption of conditional independence of the features in F'(s) given the entity. That is:

$$N(e) = P(e) \prod_{\substack{f \text{ is a} \\ \text{feature} \\ \text{in } F'(s)}} P(f(s)|e)$$

$$P(e|F'(s)) = \frac{N(e)}{\sum_{e'} N(e')}$$

Because certain values of lw strongly predict that the entity is company name, in step 430, if the score of lw is greater than x, than the entity is accepted as company name in step 432. Because certain values of address_line strongly predict that the entity is addressline, in step 434, if the score of address_line is greater than y, than the entity is accepted as address_line in step 436. Because certain values of w strongly predict that the entity is first_name, in step 438, if the score of w is greater than z, than the entity is accepted as first_name in step 440. If none of the above, then the entity is first_name in step 442. Process 400 may be coded as shown in FIG. 6.

4. Applications

A. Column Mapping

Contact data from contributors frequently comes in the form of csv files. These files have all kinds of issues. Non-standard column names (e.g. First for first_name) are common. Irrelevant columns are also often present. In a significant fraction of files, even the entire header row is missing. In such cases, the only way to identify the columns of interest and infer their correct names is to analyze the content of the file. Thus, if a column seems to contain person first names, it is probably the entity first_name, especially if other evidence corroborates it (e.g., it is immediately to the left of the last_name column). Content-based analysis is useful even when the file contains a header row. Sometimes even when a column has a name, it is ambiguous (e.g., title could mean job title or salutation). Another common case is that the column name is not recognized as a known alias.

The content-based component of column mapping uses the statistical classifier described above to score each cell's value against each possible entity name, for each cell in the top 20 or so rows in the input file. The scores returned on individual calls to the classifier are then used by a more elaborate probabilistic scoring engine to make the final column name guesses. This latter scoring involves:

Aggregation:

Scores of all cells in the same column for the various entities are combined together in a way that yields both a high recall and a high precision. For example, if the first cell's value was not recognizable as a person's first name, but 15 of the next 19 were, then the column is still judged to be a first_name column with high confidence.

Proximity:

When certain sets of entities typically occur in a certain order—e.g., first_name typically occurs immediately to the left of last_name; address line, city, state, zip, and country typically occur together, and in this order—this influences the overall score as well. As an example, if a certain column scores high for first_name and the column to its immediate right scores high for last_name, this proximity is used to increase both scores even more.

Evidence from Aliases:

Content-based scoring is also combined with alias-based scoring (when a header row is present). For example, if a certain column's content scores high for being a person name and the column is named First in the input file, then the first_name score of this column is increased even more.

Evidence from (Predicted) Names of Other Columns:

Sometimes certain columns are harder to tell apart than others from their content. In rare cases, a column containing 9 digit zips with the hyphen missing gets confused with a column containing (poorly formatted) phone numbers. Proximity can help resolve this problem. The zip column will typically occur in the middle of other location columns. Once the zip column has been identified, and assuming the phone entity has not yet been assigned to any column in the input file, the other column with similar data becomes more likely to be the phone column.

B. Check for Bad or Fraudulent Data

A contact database can be crowd-sourced and an incentivized. This sometimes leads to fraud. Poor data submissions (even when not explicitly fraud) sometimes happen as well.

The statistical classifier described herein is used to score the values of various cells in an input file for the entity represented by the cell's column. When a lot of these scores are very low, the data is suspect. For example, if most of the values in the job title column score poorly for being titles, the file is flagged as being suspicious. Suspicious files are automatically routed to humans for screening.

There are circumstances when bad data creeps into the contact database accidentally. The scoring done by the statistical classifier can identify such bad data and sometimes also fix it. For example, when a certain record has the contents of the title and the company name fields swapped, classifier-based scoring can detect this, swap the two values, and confirm that the post-swap scores are higher. In other words, both the original title and the original company name score low, but after the swap both score substantially higher.

In addition, key data in a contact record can become so irrecoverably bad that the record needs to be purged from the database, for example, where the person name contains a title instead of a name, and there is no person name anywhere in the record.

C. Query Routing

A free-text searchable database of contacts and companies may provide a single box in which the user can type "anything." The query router guesses from what the user typed (in a few milliseconds) whether the user's intent is to search for contacts, or to search for companies. The query (after appropriate structuring) is routed to searching the contacts database or the company database.

As examples, the query "cancer centers in ca" is routed to searching the company database; the query "director IT Florida" is routed to searching the contacts database.

The query router works as follows. First, the query is tokenized into terms using a heuristic method. A term is often a word; sometimes multiple words. The statistical classifier described above is used to compute posteriors, over all entities, for each term and is used to decide whether the query is a contact search query or a company search query.

D. Query Structuring

Once the query router has guessed the query type—contact search or company search—the query needs to be structured for this type. This is because the indices for contact and company search, such as those used by the Lucene search engine library, are organized in terms of searchable fields. (Some of the searchable fields in the contact index are first_name, last_name, and job title. Some of the searchable fields in the company index are company name, company website.)

The structuring results in an AND-OR Lucene query. Such a query is an AND of clauses. A clause is an OR of items. Each clause corresponds to a term in the tokenized version of the query. Let t denote a certain term in the original query as well as its corresponding clause in the structured query. Each item in t is of the form $f:t\char`\^b$ where f is a field name, and b a boost proportional to the posterior probability $P(f|t)$ that f is the entity of this term (see the previous section).

Some examples can help illustrate. In these illustrations, let the item boost be the posterior probability multiplied by 10. Consider the query "intel ceo." This query might get structured, for contact search, as the query (company:intel^10) AND (title:ceo^10). If this happens, it would mean that the classifier predicted with 100% confidence that the word "intel" corresponds to the entity company_name and the word "ceo" corresponds to the entity title.

Now consider the query "lee ceo." This query might get structured as (first_name:lee^7 OR last_name:lee^3) AND (title:ceo^10). This would mean that the classifier thinks that "lee" is a first_name with 70% confidence and a last_name with 30% confidence.

The ORing of items in the structured query is there to yield high recall, specifically to reduce the risk that some valid result is missed due to entity recognition errors. The boosts leverage the posterior probabilities to rank results which are consistent with those probabilities which are higher. Here is an example that brings out the value of this. Consider the query "manager ibm." Of the millions of titles in the contacts database, it is quite likely that some will contain the word "ibm." So the posterior of the entity title for the word "ibm" is certainly greater than 0. However, "ibm" is much more likely to be intended as a company identifying keyword in this query. So, it is desired to have results in which the company name contains the word "ibm" to rank higher than those in which "ibm" appears only in the title. This can be accomplished by setting the boosts proportional to the entity posterior probabilities. The structured contact query would be expected to be roughly (company:ibm^80R title:ibm^2) AND (title:manager^10).

E. Mapping Social Media Handles

The statistical classifier can also be used to effectively map social media handles, e.g., Twitter handles, to contact entities. For example, a retailer like Apple may like to know that the Twitter handle @johnsmith is actually their customer named John Smith, who has an iPad and an iPhone and also has a high customer lifetime value. Using the statistical classifier described above, it can be determined that @johnsmith is actually the right person. Once this is determined, a set of rules can be implemented to reach out to @johnsmith to confirm the facts.

For example, if @johnsmith followed @apple, then a message could be sent back to @johnsmith asking him to confirm he is @johnsmith by answering a challenge question. The challenge question may be presented "in-media" (via Twitter, Facebook message, etc.) or as a link via messaging to a website.

As soon as the person's identity has been confirmed, the connection is made to the existing contact entity. An "entity matching rules engine" iterates through a series of steps to figure out the person's identity. For example, in step 1, numbers are stripped from the handle. In step 2, the handle is checked against the contact database. In step 3, the handle is checked against other databases, e.g., LinkedIn.

Likewise, a simple set of parsing rules could include (i) strip numbers, (ii) look for similar names (johnnyjones→john jones), and (iii) decipher mashed together names into first/last (marysmith→mary smith, or maryjsmith→mary j. smith).

5. Detailed System Description

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 2A (and in more detail in FIG. 2B), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 2A, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2B also illustrates environment 110. However, in FIG. 2B elements of system 116 and various interconnections in an embodiment are further illustrated. FIG. 2B shows that user system 112 may include processor system 112A, memory system 112B, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for associating an entity of a contact with a character string, wherein a database stores a plurality of contacts, and each contact has a defined set of entities, comprising:
    determining, for a first subgroup of the defined set of entities, using a processor, whether the character string comprises a structure associated with the first subgroup of the defined set of entities, prior to any probabilistic approximation, wherein the structure comprises at least one character other than alphanumeric characters;
    replacing all numerical digits in the character string with a corresponding digit placeholder to generate a blurred character string in response to a determination that the character string does not comprise the structure associated with the first subgroup; and
    determining, for a second subgroup of the defined set of entities, using a processor, a probabilistic approximation that the blurred character string is associated with at least one of the defined set of entities in the second subgroup by scoring the blurred character string for each of the defined set of entities associated with the blurred character string; and
    identifying the character string as one of the set of defined entities having a highest score that satisfies a predetermined score threshold.

2. The method of claim 1, wherein the step of evaluating whether the character string comprises the structure further comprises matching the character string to a known entity structure with a probability higher than a predetermined threshold.

3. The method of claim 1, wherein the step of evaluating whether the character string comprises the structure further comprises comparing the character string to known entity entries in a table to detect a match with a near certainty.

4. The method of claim 1, wherein the step of evaluating a probabilistic approximation further comprises calculating a posterior probability over a limited set of character string features.

5. The method of claim 4, wherein the limited set of character string features include a last-word feature, a digit-blurring feature, a words feature, a full-string feature, and an address-line feature.

6. The method of claim 5, in response to the character string being evaluated to not comprise the structure, further comprising applying the full-string feature, the digit-blurring feature, the last-word feature, the address-line feature, and the word feature to determine if the character string is associated with one of the entities of the second subgroup.

7. A method for identifying entities of a contact associated with a character string, comprising:
- receiving a character string;
- determining whether the character string comprises a structure associated with a first defined entity, prior to any probabilistic approximation, wherein the structure comprises at least one character other than alphanumeric characters;
- determining whether the character string is found in a look up table in response to an evaluation that the character string does not comprise the structure associated with the first defined entity;
- replacing all numerical digits in the character string with a corresponding digit placeholder to generate a blurred character string in response to a determination that the character string is not found in the look up table;
- calculating, based on the blurred character string, a posterior probability to generate a score for each of a set of defined entities, and
- identifying the character string as one of the set of defined entities having a highest score that satisfies a predetermined score threshold.

8. The method of claim 7, the step of calculating a posterior probability further comprising:
- first evaluating a full string feature applied to the character string;
- then evaluating a digit blurring feature applied to the character string;
- then evaluating a last word feature applied to the character string;
- then evaluating an address line feature applied to the character string; and
- then evaluating a word feature applied to the character string.

9. The method of claim 8, wherein the step of evaluating a full string feature further comprises calculating a posterior probability for all entities around the full string feature when an instance of a first defined entity meeting the full string feature is found in a training set, wherein when the posterior probability is higher than a full string threshold, the character string is determined to be the first defined entity.

10. The method of claim 8, wherein the step of evaluating a digit blurring feature further comprises calculating a posterior probability for all entities around the digit blurring feature when an instance of a second defined entity meeting the digit blurring feature is found in a training set, wherein when the posterior probability is higher than a digit blurring threshold, the character string is determined to be the second defined entity.

11. The method of claim 8, wherein the step of evaluating a last word feature further comprises calculating a posterior probability for all entities around the last word feature, wherein selected values of the posterior probability indicate that the entity is company name.

12. The method of claim 8, wherein the step of evaluating an address line feature further comprises calculating a posterior probability for all entities around the address line feature, wherein selected values of the posterior probability indicate that the entity is address line.

13. The method of claim 8, wherein the step of evaluating a word feature further comprises calculating a posterior probability for all entities around the word feature, wherein selected values of the posterior probability indicate that the entity is first name.

14. The method of claim 7, wherein the step of calculating a posterior probability further comprises:
- evaluating a full string feature of the character string, and if an instance of a first defined entity meeting the full string feature is found in a training set, then calculating a posterior probability for all entities around the full string feature, wherein if the posterior probability is higher than a full string threshold, the character string is determined to be the first defined entity, and if not:
- evaluating a digit blurring feature of the character string, and if an instance of a second defined entity meeting the digit blurring feature is found in the training set, then calculate a posterior probability for all entities around the digit blurring feature, wherein if the posterior probability is higher than a digit blurring threshold, the character string is determined to be the second defined entity, and if not:
- calculating a posterior probability for all entities around a last word feature, wherein if the posterior probability is higher than a last word threshold, the character string is determined to be a third defined entity, and if not:
- calculating a posterior probability for all entities around an address line feature, wherein if the posterior probability is higher than an address line threshold, the character string is determined to be a fourth defined entity, and if not:
- calculating a posterior probability for all entities around a first name feature, wherein if the posterior probability is higher than a first name threshold, the character string is determined to be a fifth defined entity, and if not the character string is likely an eighth defined entity.

15. A non-transitory computer-readable medium encoded with instruction for identifying entities of a contact associated with a character string, the instructions when executed by a processor comprise the steps of:
- receiving a character string;
- evaluating whether the character string comprises a structure associated with a first defined entity, prior to any probabilistic approximation, wherein the structure comprises at least one character other than alphanumeric characters;
- evaluating whether the character string is found in a look up table in response to an evaluation that the character string does not comprise the structure associated with the first defined entity;
- replacing all numerical digits in the character string with a corresponding digit placeholder to generate a blurred character string in response to a determination that the character string is not found in the look up table;
- calculating, based on the blurred character string, a posterior probability to generate a score for each of a set of defined entities; and
- identifying the character string as one entity of the set of defined entities having a highest score that satisfies a predetermined score threshold.

16. The computer-readable medium of claim 15, the step of calculating a posterior probability further comprising:
- first evaluating a full string feature applied to the character string;
- then evaluating a digit blurring feature applied to the character string;
- then evaluating a last word feature applied to the character string;
- then evaluating an address line feature applied to the character string; and
- then evaluating a word feature applied to the character string.

17. The computer-readable medium of claim 16, wherein the step of evaluating a full string feature further comprises calculating a posterior probability for all entities around the full string feature when an instance of a first defined entity meeting the full string feature is found in a training set, wherein when the posterior probability is higher than a full string threshold, the character string is determined to be the first defined entity.

18. The computer-readable medium of claim 16, wherein the step of evaluating a digit blurring feature further comprises calculating a posterior probability for all entities around the digit blurring feature when an instance of a second defined entity meeting the digit blurring feature is found in a training set, wherein when the posterior probability is higher than a digit blurring threshold, the character string is determined to be the second defined entity.

19. The computer-readable medium of claim 16, wherein the step of evaluating a last word feature further comprises calculating a posterior probability for all entities around the last word feature, wherein selected values of the posterior probability indicate that the entity is company name.

20. The computer-readable medium of claim 16, wherein the step of evaluating an address line feature further comprises calculating a posterior probability for all entities around the address line feature, wherein selected values of the posterior probability indicate that the entity is address line.

21. The computer-readable medium of claim 16, wherein the step of evaluating a word feature further comprises calculating a posterior probability for all entities around the word feature, wherein selected values of the posterior probability indicate that the entity is first name.

22. The computer-readable medium of claim 15, the step of calculating a posterior probability further comprising:
  evaluating a full string feature of the character string, and if an instance of a first defined entity meeting the full string feature is found in a training set, then calculating a posterior probability for all entities around the full string feature, wherein if the posterior probability is higher than a full string threshold, the character string is determined to be the first defined entity, and if not:
  evaluating a digit blurring feature of the character string, and if an instance of a second defined entity meeting the digit blurring feature is found in the training set, then calculate a posterior probability for all entities around the digit blurring feature, wherein if the posterior probability is higher than a digit blurring threshold, the character string is determined to be the second defined entity, and if not:
  calculating a posterior probability for all entities around a last word feature, wherein if the posterior probability is higher than a last word threshold, the character string is determined to be a third defined entity, and if not:
  calculating a posterior probability for all entities around an address line feature, wherein if the posterior probability is higher than an address line threshold, the character string is determined to be a fourth defined entity, and if not:
  calculating a posterior probability for all entities around a first name feature, wherein if the posterior probability is higher than a first name threshold, the character string is determined to be a fifth defined entity, and if not the character string is likely an eighth defined entity.

23. An apparatus for identifying entities of a contact associated with a character string, comprising:
  a processor; and
  one or more stored sequences of instructions which, when executed by the processor, cause the processor to carry out the steps of:
    receiving a character string;
    evaluating the character string first for structure, without calculating any posterior probability, wherein the structure comprises at least one character other than alphanumeric characters, then evaluating the character string as a look up, and
    replacing all numerical digits in the character string with a corresponding digit placeholder to generate a blurred character string in response to a determination that the character string does not comprise structure and is not found in the look up table;
    calculating, based on the blurred character string, a posterior probability to generate a score for each of a set of defined entities; and
    identifying the character string as one entity of the set of defined entities having a highest score that satisfies a predetermined score threshold.

* * * * *